July 4, 1967
C. D. LOWERY
3,329,290
ORCHARD APPARATUS
Filed Aug. 16, 1965
2 Sheets-Sheet 1
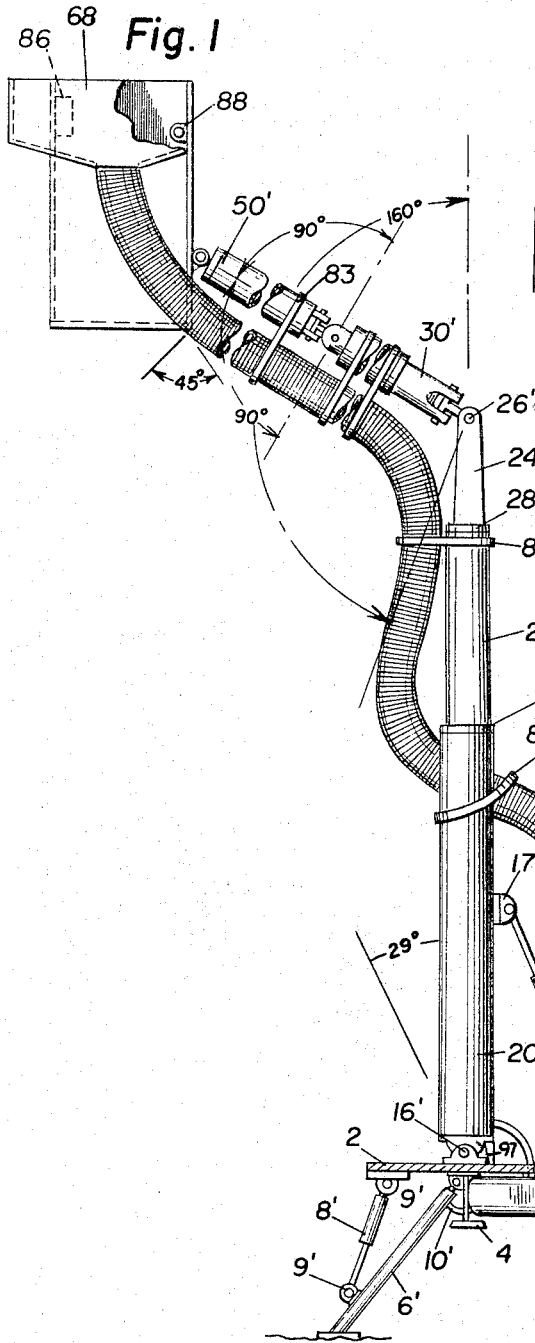
Fig. 1
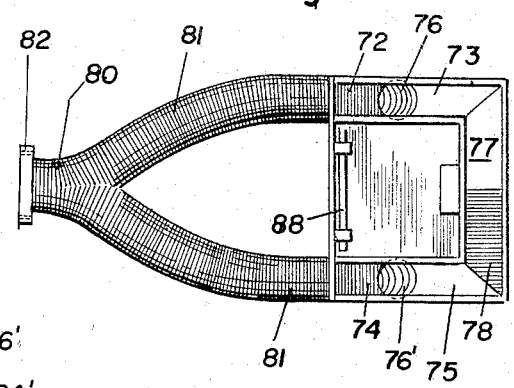
Fig. 2
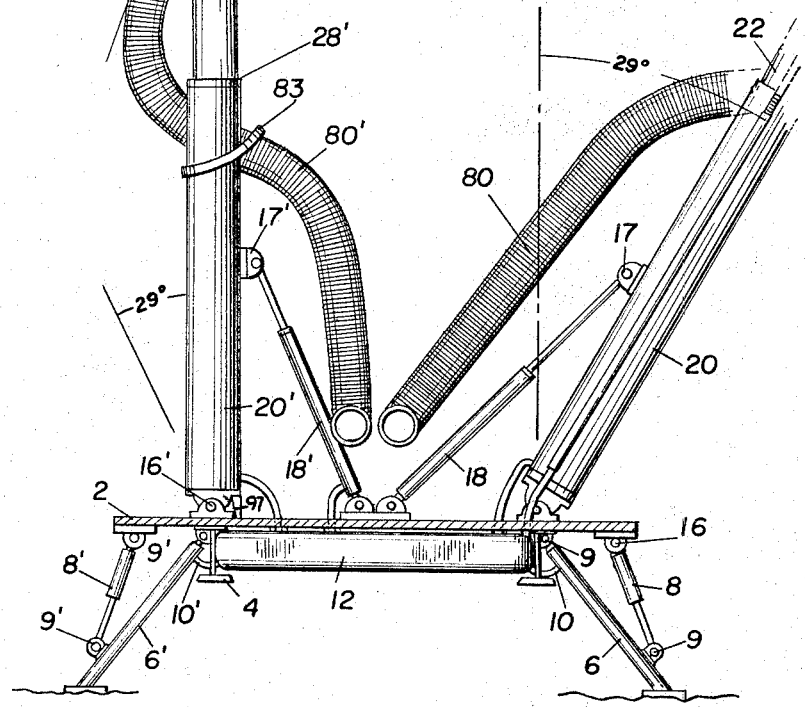
INVENTOR,
Carthel D. Lowery
Semmes & Semmes
ATTORNEYS July 4, 1967
C. D. LOWERY
3,329,290
ORCHARD APPARATUS
Filed Aug. 16, 1965
2 Sheets-Sheet 2
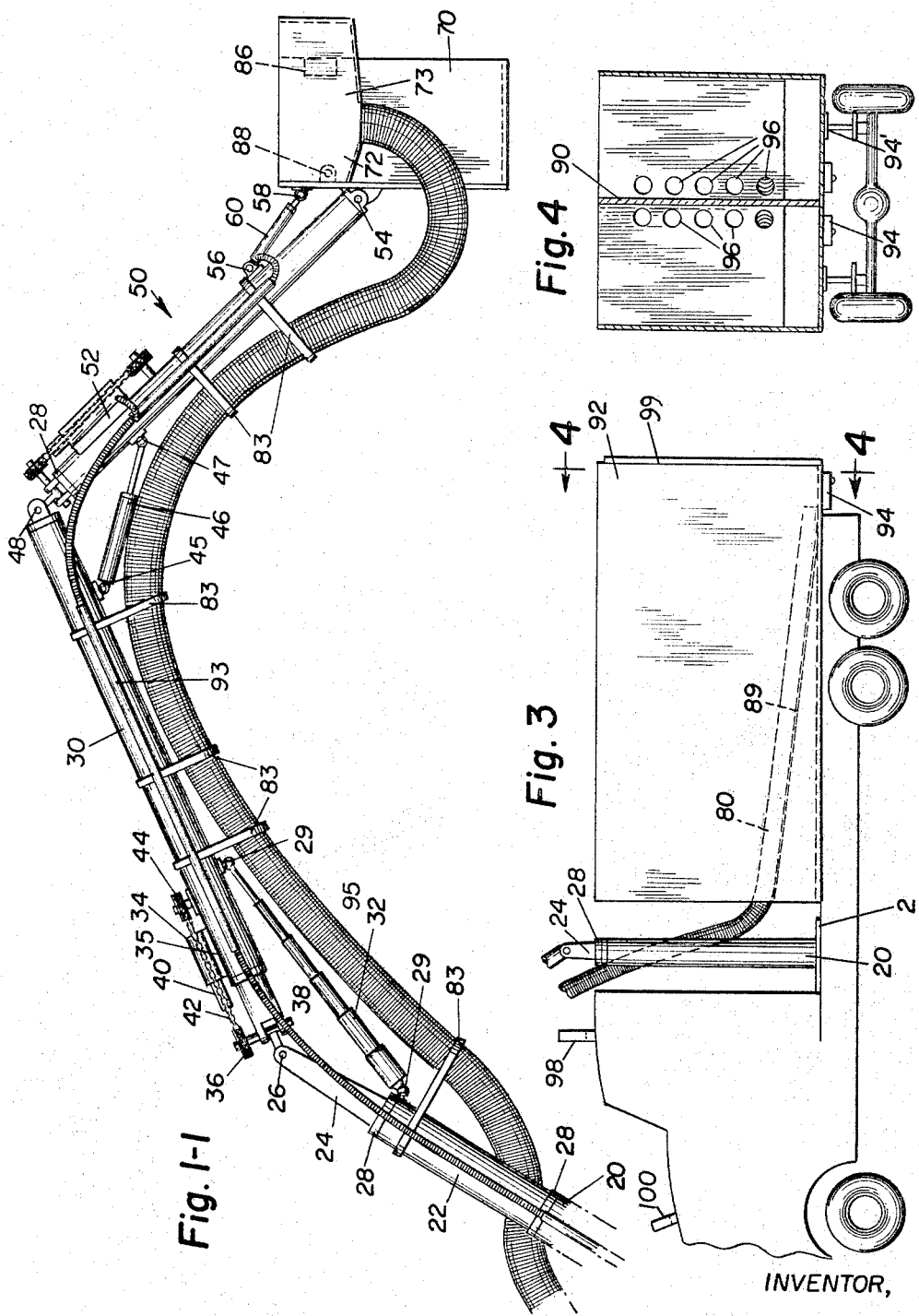
INVENTOR,
Carthel D. Lowery
by Semmes & Semmes
ATTORNEYS United States Patent Office 3,329,290
Patented July 4, 1967

3,329,290
ORCHARD APPARATUS
Carthel D. Lowery, 921 Coral Drive,
West Palm Beach, Fla. 33406
Filed Aug. 16, 1965, Ser. No. 479,728
13 Claims. (Cl. 214—83.1)

ABSTRACT OF THE DISCLOSURE

The invention may be described as an adjustable conveyance for fruit pickers which may be mounted on a vehicle such as a truck and which is hydraulically controlled to place the picker at strategic points about the tree which bears the fruit, and furthermore to give the picker a means of transferring picked fruit from the platform where he stands back to the vehicle which supports the entire unit. For example, a truck bearing this hydraulically controlled boom at the end of which is a platform for the fruit picker, may be extended and retracted, lowered and/or raised and/or simultaneously moved from side to side to enable the fruit picker to position himself, from time to time, adjacent that portion of tree or trees bearing the ripened fruit.

---

The present invention is concerned with an apparatus for enabling orchard products to be easily and efficiently picked from trees. However, it is not limited to such products, but may be used on any type of product which must be picked or worked from a relatively high altitude as compared to the ground. It may also be used for such services as pruning, spraying, thinning, etc. as required in the orchard industry.

It is important that orchard fruits be hand picked to prevent bruising. In the past, it has been necessary for fruit pickers to climb trees or use ladders to pick the fruit. Scaffolds are also used, and a few crane type devices have been the subject of various patents. For example, see the Frost United States Patent No. 3,182,827 and the Miller, United States Patent No. 2,450,152. These generally disclose a crane device mounted upon a mobile scaffold, with a picker's platform at the end of the crane. My invention comprises a combination which is more efficient and maneuverable as compared to the Frost and Miller types of conventional devices, and which greatly automates the sorting and packing operation, as well as the picking operation.

It is therefore an object of invention to provide to provide an apparatus to convey fruit to a mobile platform.

It is another object of this invention to provide a device incorporating a picker's platform mounted at the end of a boom that is supported by a mobile unit, to enable the efficient picking, conveying, sorting and packing of fruit.

It is another object of invention to provide a storage box on the mobile platform for storing each picker's fruit individually, and wherein carrier tubes efficiently convey fruit from the picker's platform to the storage box.

It is another object of the invention to provide a boom that is maneuverable into innumerable positions, to enable fast and efficient picking of fruit from a tree.

These and other objects of the invention will be apparent from the following specification and drawing in which:

FIGURE 1 is a side view of the apparatus as mounted on a truck frame;

FIGURE 1-1 is a continuation of FIGURE 1;

FIGURE 2 is a plan view of the operator's platform;

FIGURE 3 is a side view of the truck upon which the fruit picking apparatus is mounted, illustrating the tubes feeding into the box mounted on the truck;

FIGURE 4 is a section view of the truck taken along the section lines 4—4 of FIGURE 3, and illustrates the different levels of storage, as well as the different areas into which the fruit picked by individual workers is separately stored.

FIGURE 1 illustrates the basic support for the boom and picker's platform. As illustrated, steel plate 2 is welded to a truck frame, 4, the width of which may vary according to the particular truck used. The plate is further supported by the ground through hydraulic feet 6 and 6' which support the boom assemblies when the device is in operation. The positions of hydraulic feet 6 and 6' are controlled by double acting hydraulic cylinders 8 and 8', the controls for which are mounted in either the truck cab or operator's platform, or preferably, dual controls may be located in both places. Thus, the activation of hydraulic cylinders 8 and 8' will vary the vertical position of the supporting hydraulic feet 6 and 6' because of pivotal hinges 9 and 9', depending upon the height of the truck frame from the ground.

Tank 12 is the hydraulic fluid reservoir for the entire hydraulic cylinder system of the combination. Tubes 10 and 10 feed hydraulic cylinders 8 and 8' through the hydraulic feet 6 and 6'.

FIGURE 1 also illustrates the particular boom combination utilized, and shows two picker's platforms being supported by individual booms. Additional boom and picker platform sets may also be used, if necessary. Each of the booms comprises a tubular steel base 20 or 20' which is preferably 8 inches in diameter. When not in use, base sections 20 and 20' rest in position against stops 97.

Tubular sections 20 and 20' are variable in the vertical plane 29° from the normal in one direction as indicated in FIGURE 1. This movement is effected via double acting hydraulic cylinders 18 and 18' which tilt or pivot sections 20 and 20' via their connections to pivot supports 16 and 16', and to 17 and 17', respectively. As illustrated, pivot supports 16 and 16' are mounted on steel plate 2, and pivot supports 17 and 17' are mounted on tubes 20 and 21 respectively, and permit pivoting or tilting of the tubular sections 20 and 20' from 0 to 29° in only the normal vertical plane. The length of sections 20 and 20', 22 and 22' and 24 and 24', as well as 30 and 30' and 50 and 50' vary according to grove requirements.

Sections 22 and 22' are telescopically mounted into sections 20 and 20', respectively, and their lengths vary with respect to groove requirements as do sections 20 and 20'. The controls for the telescopic action of tubes 22 and 22' with respect to tubes 20 and 20' are located on the picker's platform. Finally, sections 24 and 24' are mounted at the ends of sections 22 and 22'. Pivots 26 and 26' mounted at the ends of sections 24 and 24' permit vertical motion of sections 30 and 30'. Hereinafter, the hydraulic controls will only be illustrated and described for the boom section, beginning with section 20'. However, the boom section beginning with section 20, including the hydraulic controls, is identical.

The vertical motion of section 30 is controlled by telescopic hydraulic cylinder 23 which is connected between tubular steel section 22 and 30 via ball joints 29 located on both ends of the hydraulic cylinder, so as to allow section 30 to move in any direction. Hydraulic cylinder 34 controls the movement of section 30 in the horizontal plane. The double acting hydraulic cylinder 34 is welded to a cradle 35 which in turn is welded to tubular steel section 30. Sprocket 36 is welded to the axis of universal joint 38 which is attached to pivot 26. A rod 40 connected to the hydraulic cylinder actuates chain 38 which is wound around sprocket 36 and free turning sprocket 44. Movement of the chain 38 in this manner will rotate sprocket 36 and free turning sprocket 44. Movement of the chain 38 in this manner will rotate sprocket 36 and the universal joint 38, thus rotating the tubular section 30 in the horizontal direction.

Sections 30 and 30′ have operating ranges of 180° in the horizontal plane and are provided with locks and stops in positions where the section becomes parallel with the truck frame. The operating range of sections 30 and 30′ in the vertical plane is 160°, and the sections are provided with stops and locks in vertical position for transportation.

A similar hydraulic cylinder-sprocket-universal joint section is provided in order to horizontally rotate section 50. Again, cylinder 52 is a double acting hydraulic cylinder and is welded to a cradle, which in turn is welded to the tubular steel section 50. The sprocket arrangement is connected to a rod which is activated by the hydraulic cylinder 52, to rotate tubular section 50 horizontally. The hydraulic cylinders rotating sections 30 and 50 are preferably inside a safety enclosure, and are provided with conventional automatic chain tighteners. The sprockets and cylinders are sized and located so that the desired operational range of sections 30 and 50 will be attained. Also connected between sections 30 and 50, is a single acting hydraulic cylinder 46 to control the motion of section 50 in the vertical plane through pivot support 48. Ball joints 45 and 47 are provided on both ends of hydraulic cylinder 46 to allow movement of section 50 in any direction.

The operating range of section 50 in the vertical plane is 90°, and in the horizontal plane is 90° in each direction with respect to section 30. Section 50 is provided with stops and locks in the vertical plane where the axes of sections 30 and 50 coincide for transportation.

Double acting hydraulic cylinder 60 is also attached to section 50 and to platform 70 via pivot supports 56 and 58, respectively, and operates the platform in the vertical plane only. Platform 70 is supported by section 50 through pivot support which permits the vertical movement of the platform. The platform may tilt 45° either way in the vertical plane with respect to section 50.

FIGURE 1 illustrates the hydraulic fluid reservoir for the hydraulic cylinders utilized in the apparatus. The hydraulic cylinders are fed from the reservoir 12 through hydraulic fluid hoses 10. Steel conduit 93 is mounted on the boom, with a flexible conduit material 95 being placed at section joints and along telescopic section 22. The conduit contains the high pressure hydraulic hoses which operate the five hydraulic cylinders located above section 20. As further illustrated in FIGURE 1, hoses 10 are outlets from the hydraulic hoses contained in the conduits to the hydraulic cylinder pump.

Platform 70 is constructed of canvas on three sides and on the bottom, stretched over a tubular steel framework. An aluminum plate is provided on the bottom for the operator to stand on. The fruit trough 68 is of the same construction as the sides. The back of the platform may be made of sheet metal steel or aluminum.

The purpose of the boom construction is to support the fruit carrier tubes 80 and 80′. FIGURE 3 illustrates racks 98 and 100 which are provided with locks to secure the boom sections while in transit. Brackets 83 are mounted throughout the boom to support the carrier tube, and are constructed large enough so that the tube will slide easily through at all times. One is spaced near the end of each boom section as illustrated in FIGURE 1. The fruit carrier tube is constructed of flexible material so that it may expand or contract to any length, or bend to any shape, within the scope of operation of the boom section, while retaining a constant inside diameter at all times. The carrier tube is lined with special soft material to prevent bruising of the fruit as it falls down the tube.

The fruit carrier tubes will be available in 3, 4, 5 and 6 inch diameters to facilitate proper handling of any fruit crop, and are interchangeable. The particular diameter tube that will permit the free fall of the fruit, without permitting several pieces of fruit to join together and clog up the tube, will be used. That is, the optimum carrier tube diameter is that which is just sufficient to let the particular fruit being picked fall freely down.

As illustrated in FIGURE 2, the picker's platform 70 has two outlets feeding into the carrier tube 80. These are designated as elements 81 and 81′, which joint just before coupler 82. Sections 81 and 81′ comprise 6 inch carrier tubes and are permanently fastened to platform 70 at their individual ends. Their jointed sections are permanently fastened to coupler 82. However, the carrier tube section 80 may be disconnected from coupler 82 to enable different size carrier tubes to be connected, depending upon the particular size of fruit being picked. Coupler 82 thereby allows changing to a carrier tube of different diameter with a minimum of effort and lost time.

As illustrated in FIGURES 1 and 2, a 6-inch wide fruit trough 68 is constructed on three sides of the picker's platform, so that the fruit will fall by gravity to the carrier tubes located on either side of the basket. The fruit trough is sloped on both sides of the picker's platform. As illustrated, sections 72 and 73 of one side slope downwards toward the center of the fruit trough towards hole 76. Sections 74 and 75 on the other side of the picker's platform slope downwards toward the center of the fruit trough towards hole 76′. In the front of the fruit trough, section 77 slopes downwards towards section 73, and section 78 slopes downwards towards section 75.

Control panel 86 is provided in the front of the picker's platform and contains the control for all the hydraulic cylinders so that the individual packer may easily negotiate his way among the leaves of the trees to pick the fruit. A safety belt bar 88 is also mounted on the picker's platform and is provided with a sliding ring for a self safety belt. In this manner the picker may move from either section of the platform to another with safety.

Approximately one and one half boxes of fruit can be held in the area encompassed by the fruit trough and sections 81 and 81′ of the tube coupling, enabling the picker to pick fruit from the bottommost section of the tree first since the fruit will fall by gravity from the fruit trough towards the coupler 82. Under these conditions, part of the carrier tube 80 may be above the coupler 82 and therefore the fruit will not fall by gravity down through the flexible carrier tube 80 and into the truck box. However, as the picker finishes picking the fruit from the bottom section of the tree, he will activate the controls thereby lifting himself gradually to the upper portions of the tree, until the point is reached where the platform and sections 81 and 81′ are higher than tube section 80. At that point, the fruit will fall through section 80 of the carrier tube and down into the truck box.

I have found, that providing a fruit through with a storage capacity of one and one half boxes of fruit, is sufficient to enable the fruit picker to speedily and constantly pick fruit until, when the point is reached that the fruit through it is filled, it is also at a height above the carrier tube 80. This enables the fruit to fall down the carrier tube 80 and permit the picker to continue picking and filling the fruit trough.

Having described my boom construction and platform, my device operates in the following manner. Depending upon the size of the particular fruit to be picked, carrier tubes 80 and 80′ which are either 3, 4, 5 and 6 inches in diameter, will be fitted through brackets 83 and joined to coupler 82. It is standard practice in orchards to plant trees in straight rows and columns. The truck will move between a particular row, and will stop when each of the boom sections is directly across from a tree located on either side of the row. Boom sections 20 and 20′ will then be tilted towards their respective trees, the angle of tilt depending upon the particular size and shape of the tree.

The picker standing in the picker's platform 70, will engage a safety belt with safety bar 88, and will commence picking fruit starting from the bottom of the tree, working his way towards the top of the tree. In the bottom section of the tree, the picker's platform and tubes 81 and 81' may be below the carrier tube 80. Thus, the fruit will not fall down into the truck box. However, the storage provided in the fruit trough and sections 81 and 81', as heretofore disclosed to be one and one half boxes, will enable the picker to continually pick fruit until he works his way up to a portion of the tree where the picker's platform is above the carrier tube 80. Thus, the fruit he has picked to that point will then fall down the carrier tube because of the force of gravity.

The advantage of construction of the boom in three sections, with a great variance in vertical and horizontal positioning, is that the fruit picker will be able to negotiate his way about the tree efficiently and quickly and will be able to cover the entire tree in a very short time. This efficiency is compounded by the fact that the controls for the hydraulic cylinder pumps are operated by the picker himself via the control panel 86 mounted in the front of the picker's platform 70. Thus, the picker will be able to maneuver himself around, rather than having to direct instructions to someone in the truck, or in some control position on the ground. For safety purposes a dual set of controls for all hydraulic cylinders may be mounted in the truck. Then, if the fruit picker is incapacitated for some reason, the controls in the truck may be used to maneuver the platform down.

As the fruit is conveyed down the carrier tube 80, it will feed into a box 92 located on the truck, as illustrated in FIGURES 3 and 4. Tube section 80 feeds the fruit into a hole in box 92 and falls by gravity down an inclined steel ramp 89 towards a trap door or chute 94. From there the fruit may be unloaded into boxes.

If it is desired to store the fruit in box 92, tube 80 may be removed and placed in another higher ramp. FIGURE 4 is a cross-sectional view of the truck, and shows how different levels of ramps fed by successively higher holes 96 are located throughout the elevation of the truck. As the lower ramps are filled, the tube is raised to an upper inclined ramp until the entire box is filled. The filled box may then be moved to a processing area, and be replaced on the truck by an empty box. At the processing area tailgate 99 may be removed and the contents emptied from the box.

The tubes 80 and 80' feed into separate sections of the box since it is divided by partition 90. In this manner, each operator's pick is automatically separated, and the amount which each operator picks per day can easily be determined. This is quite important, because the operator's salary is usually determined according to the amount of fruit picked.

The box 92 consists of a steel box which is on the truck's chassis. Trap door 94 conveys fruit picked by the operator working into tube 80, and trap door 94' conveys fruit picked by the operator working into tube 80'. The holes 96 in the box are 6 inches in diameter to allow any size carrier tube to slip in and out freely, and the extra footage of carrier tube illustrated in FIGURE 3 is provided to prevent the tube from being pulled out of the box when sections 20 and 20' are in tilted position. The entire inside area of the box, the ramps and chutes are covered with special material to prevent bruising of the fruit.

Having thus described my invention, I claim the following:

1. Orchard apparatus which comprises:
   (A) a boom comprising three sections, each of said sections being of variable length, depending upon orchard requirements;
      (A1) a first said section being variable in the plane only and mounted on a mobile platform;
      (A2) a second said section being variable in both horizontal and vertical planes, and mounted on said first section;
      (A3) a third section being variable in both horizontal and vertical planes and mounted on said second section;
   (B) a fruit picker's platform mounted at the other end of said boom, siad platform being variable in the vertical plane only and mounted on said third section;
   (C) a firuit trough supported by said platform;
   (D) a carrier tube supported on said boom and connected to said fruit trough to convey fruit placed in said trough down the carrier tube and towards the mobile platform;
   (E) a box mounted on said mobile platform to which said carrier tube is attached, whereby fruit place in said fruit trough is conveyed down said conveyor tube and into said box.

2. The orchard apparatus as described in claim 1 wherein the horizontal and vertical positioning of said three sections is effected by hydraulic cylinders, the controls for said hydraulic cylinders being mounted on said picker's platform.

3. The orchard apparatus as described in claim 2 wherein a safety bar is mounted on said picker's platform, said safety bar being provided with a sliding ring to accommodate a safety belt attached to the picker, whereby the picker may move around the platform with safety.

4. The orchard apparatus as described in claim 3 wherein said box comprises a ramp, said ramp being at an angle so that fruit conveyed from said conveyor tube to said ramp rolls down said ramp by gravity.

5. Orchard apparatus which comprises:
   (A) a boom comprising three sections, each of said sections being of variable length depending upon orchard requirements, and wherein said boom may be rotated in the horizontal and vertical directions;
      (A1) said first section being constructed so as to be variable in the vertical plane only in a range of 0 to 29° from the normal; said first section being mounted to said mobile platform;
      (A2) said second section being variable in the horizontal direction only in a range from 0 to 180°, and in the vertical direction from 0 to 160°, said second section being mounted to said first section;
      (A3) said third section being variable in the horizontal direction by an angle of 90° with respect to said second section and in the vertical direction by an angle of 90°; said third section being mounted on said second section;
   (B) a fruit picker's platform mounted at the other end of said boom, said picker's platform being variable in the vertical plane only by an angle of 45° either way with respect to said third section, said platform being mounted on said third section;
   (C) a carrier tube supported on said boom and connected to said fruit trough to convey fruit placed in said trough down the carrier tube, and towards the mobile platform;
   (D) a box mounted on said mobile platform to which said carrier tube is attached, whereby fruit placed in said fruit trough is conveyed down said conveyor tube and into said box.

6. Orchard apparatus which comprises:
   (A) a boom comprising a plurality of sections, said boom being mounted on one end to a mobile platform;
   (B) a fruit picker's platform mounted at the other end of said boom, said picker's platform being in the shape of an open rectangular basket,
      (B1) said basket comprising:
         two sides, a front, a back and a floor; said two sides and said front being constructed of canvas stretched over a tubular steel framework; said floor consisting of an aluminum plate upon which the friut picker stands; said back comprising a steel plate;

(C) a fruit trough mounted on said sides and on said front of said picker's platform;
   (C1) said two sides of said fruit trough defining a hole in approximately the center thereof, and being constructed so that they slope towards said hole;
   (C2) said front of said trough being constructed so that half of it slopes towards the hole on one of said sides of said fruit trough, and the other half slopes towards said hole on the other of said sides of said fruit trough, whereby fruit placed in either the front or side portions of said fruit trough are conveyed towards said hole;
(D) a carrier tube supported on said boom and connected to said fruit trough to convey fruit placed in said trough down the carrier tube and towards the mobile platform;
(E) a box mounted on said mobile platform to which said carrier tube is attached, whereby fruit placed in said fruit trough is conveyed down said conveyor tube and into said box.

7. The orchard apparatus as described in claim 6 wherein said carrier tube branches off into two feeder tubes, each of said feeder tubes being connected to separate one of said holes in said platform.

8. The orchard apparatus as described in claim 7, wherein said carrier tube and said feeder tubes are joined together by a coupler, said coupler being constructed so that said carrier tube may be easily disconnected, whereby different diameter carrier tubes may be inter-changed and utilized depending upon the size fruit picked.

9. The orchard apparatus as described in claim 8, wherein said box comprises a ramp, said ramp being at an angle so that fruit conveyed from said conveyor tube to said ramp rolls down said ramp by gravity.

10. The orchard apparatus as described in claim 8, wherein said box comprises a plurality of ramps placed at successively higher levels within said box, and wherein said ramps are fed by holes in said box through which said carrier tube is inserted, whereby as each successive ramp is filled with fruit, the carrier tube may be inserted into a higher ramp so that the entire box may be stored with fruit.

11. The orchard apparatus as described in claim 10, wherein a trap door is provided to empty said ramps stored with fruit.

12. The orchard apparatus as described in claim 4, wherein a tailgate is provided at the end of said ramp for unloading the fruit.

13. The orchard apparatus as described in claim 10, wherein two booms and associated tubes and platforms are mounted on said truck, and wherein said box is provided with two sets of holes, ramps and trap doors, with a partition between said two sets, so that the tube feeding each set of box holes and ramps enables each picker's fruit to be individually sorted.

References Cited
UNITED STATES PATENTS

| | | | |
|---|---|---|---|
| 2,674,500 | 4/1954 | Hukari | 182—2 |
| 2,821,312 | 1/1958 | Wiegel | 214—83.1 |
| 2,831,589 | 4/1958 | Way | 214—147 |
| 2,973,112 | 2/1961 | Young | 214—83.1 |
| 3,042,234 | 7/1962 | Davis | 214—141 |

FOREIGN PATENTS 243,837   3/1963   Australia.

GERALD M. FORLENZA, *Primary Examiner.*

ALBERT J. MAKAY, *Examiner.*